United States Patent [19]

Wahle et al.

[11] 4,193,409
[45] Mar. 18, 1980

[54] METHOD AND APPARATUS FOR REGULATING THE PERMEABILITY OF WRAPPING MATERIAL FOR ROD-SHAPED SMOKERS' PRODUCTS

[75] Inventors: Günter Wahle, Reinbek; Uwe Heitmann, Schwarzenbek; Erwin Oesterling, Hamburg; Rolf Dahlgrün, Schwarzenbek, all of Fed. Rep. of Germany

[73] Assignee: Hauni-Werke Körber & Co. Kg., Hamburg, Fed. Rep. of Germany

[21] Appl. No.: 841,108

[22] Filed: Oct. 11, 1977

[30] Foreign Application Priority Data

Oct. 13, 1976 [LU] Luxembourg .................... 75989

[51] Int. Cl.² ............................................. A24C 5/32
[52] U.S. Cl. ............................ 131/23 R; 131/170 R
[58] Field of Search ............... 131/20 R, 21 R, 23 R, 131/216, 26, 21 C, 32, 27 R, 83 R, 83 A, 27 A, 170 R; 73/38, 40; 93/1 C, 77 FT; 219/384, 121 LM, 121 L

[56] References Cited

U.S. PATENT DOCUMENTS

| | | | |
|---|---|---|---|
| 3,475,591 | 10/1969 | Fujii et al. | 131/23 R |
| 3,483,873 | 12/1969 | Hinzmann et al. | 131/23 R |
| 3,720,095 | 3/1973 | Molins | 73/38 |
| 3,769,832 | 11/1973 | Baier | 73/38 |
| 3,948,084 | 4/1976 | Heitmann et al. | 73/38 |
| 3,962,906 | 6/1976 | Heitmann et al. | 73/38 |
| 3,991,605 | 11/1976 | Reuland | 73/38 |
| 4,061,148 | 12/1977 | Goslin et al. | 131/23 R |

Primary Examiner—Vincent Millin
Attorney, Agent, or Firm—Peter K. Kontler

[57] ABSTRACT

A web which is converted into wrappers of plain or filter cigarettes, or the wrapper or each cigarette is perforated by needles, teeth, punching tools, sparks or laser beams prior to arrival of corresponding cigarettes at a pneumatic testing station. The testing device at such station transmits signals which denote the permeability of successive wrappers, and the signals are compared with a reference signal denoting the desired permeability of wrappers. If the monitored permeability deviates from the desired permeability, the device which makes holes in the web or in the wrappers is automatically adjusted to change the combined area of holes.

23 Claims, 8 Drawing Figures

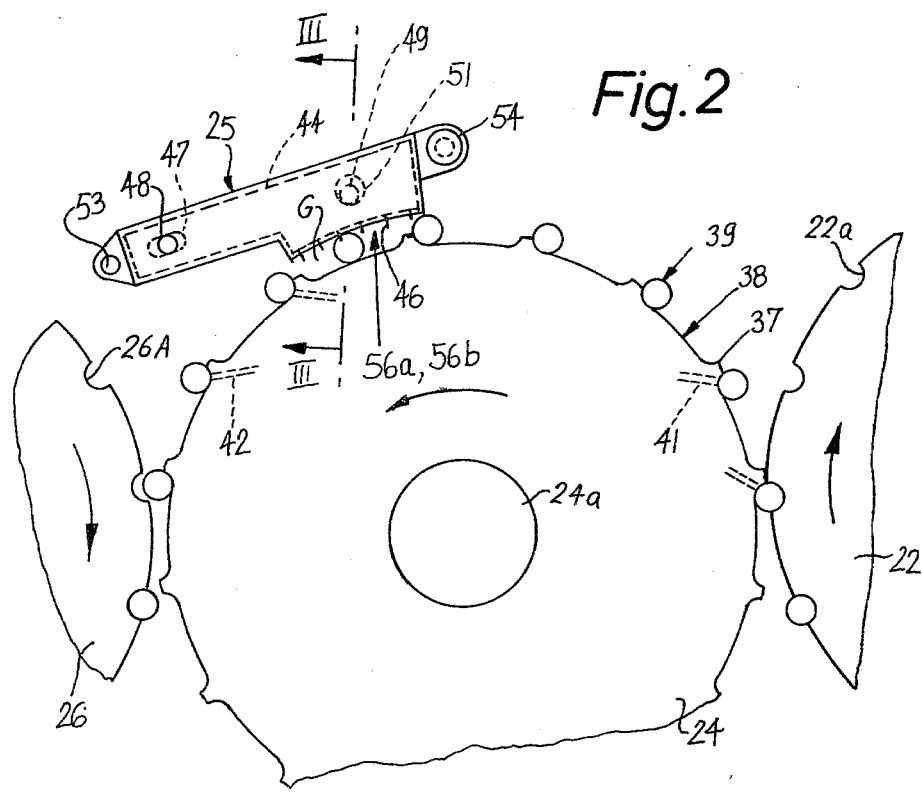
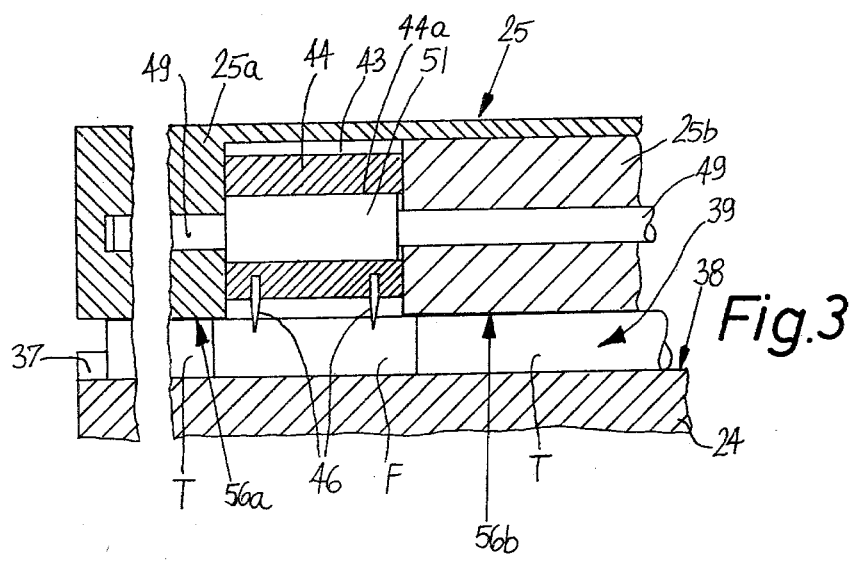

METHOD AND APPARATUS FOR REGULATING THE PERMEABILITY OF WRAPPING MATERIAL FOR ROD-SHAPED SMOKERS' PRODUCTS

CROSS-REFERENCE TO RELATED APPLICATION

The method and apparatus of the present invention constitute an improvement and a further development of the method and apparatus disclosed in the commonly owned copending application Ser. No. 735,166 filed Oct. 26, 1976 by Alfred Hinzmann now U.S. Pat. No. 4,110,448.

BACKGROUND OF THE INVENTION

The present invention relates to a method and apparatus for providing the wrappers of rod-shaped smokers' products with perforations or other types of holes which admit atmospheric air into the column of tobacco smoke entering a smoker's mouth. More, particularly, the invention relates to a method and apparatus for regulating and maintaining at a desired level the rate of admission of cool atmospheric air into the column of tobacco smoke in a region which is preferably close to one end of a rod-shaped smoker's product, such as a plain or filter tipped cigarette, cigarillo or cigar. Still more particularly, the invention relates to improvements in a method and apparatus for regulating the permeability of wrapping material for rod-shaped smokers' products to insure that the wrapper of each and every product which leaves the maker (or at least the great majority of such products) will exhibit an optimum permeability.

The provision of the wrappers of cigarettes or like rod-shaped smokers' products (hereinafter called cigarettes or filter cigarettes) with so-called climatic zones (i.e., with zones which are perforated in order to permit energy of cool atmospheric air) is becoming increasingly popular; in fact, many manufacturers of cigarettes demand that each machine for the making of cigarettes be equipped with apparatus which can perforate selected portions of the wrappers in a region close to one or both ends of a plain cigarette or in a region close to (and including) the mouthpiece of a filter cigarette. The admission of cool atmospheric air into the column of tobacco smoke flowing into the smoker's mouth reduces the percentage of nicotine and condensate. Furthermore, atmospheric air reduces the temperature of the smoke column. Presently known proposals to perforate the wrappers of cigarettes or the like are not entirely satisfactory, mainly because the quantity of admitted atmospheric air varies from cigarette to cigarette or from cigarettes in one pack or carton to cigarettes in another pack or carton. This is an irritant to the purchaser of cigarettes, especially if the differences between the permeabilities of wrappers of successively lighted cigarettes are readily detectable.

OBJECTS AND SUMMARY OF THE INVENTION

An object of the invention is to provide a novel and improved method which insures that the wrapper of each and every cigarette or an analogous article of a long series of articles exhibits identical permeability, i.e., that each such article can admit identical quantities of atmospheric air into the column of tobacco smoke in a lighted article.

Another object of the invention is to provide a method of the just outlined character which renders it possible to rapidly change the permeability of wrappers when the detected permeability deviates from an optimum value.

A further object of the invention is to provide a method which can be resorted to irrespective of the exact nature of instrumentalities which are used to perforate the wrappers.

An additional object of the invention is to provide a method which can be practiced by resorting to relatively simple and compact apparatus.

Another object of the invention is to provide a novel and improved apparatus for regulating the permeability of wrappers of plain or filter cigarettes or analagous rod-shaped smokers' products.

An ancillary object of the invention is to provide an apparatus which can include one or more conventional component parts of presently known makers of cigarettes or the like and which can be incorporated in such makers with a minimum of cost.

A further object of the invention is to provide an apparatus which can regulate the permeability of wrapping material at any one of several convenient locations in a cigarette maker or the like so that the installation of such apparatus contributes little to the bulk of existing makers.

Another object of the invention is to provide an apparatus which reduces the number of rejects in a cigarette maker or the like by insuring that the permeability of the wrapper of each and every article which leaves the maker matches or closely approximates a desirable optimum value.

One feature of the invention resides in the provision of a method of regulating the permeability of wrappers of rod-shaped articles (e.g., plain cigarettes and especially filter cigarettes) which constitute or form part of smokers' products. The method comprises the steps of making holes in the wrappers so as to permit entry of atmospheric air when the respective products are lighted at one end and a column of tobacco smoke is drawn through the other end of the products, testing the articles with a gaseous fluid including establishing a pressure differential between the interior and exterior of the wrappers (at least in the region of the holes) so that the testing fluid flows through the wrappers at a rate which is a function of the combined area of holes in the wrappers, monitoring the rate of fluid flow through the wrappers (e.g., by means of an electropneumatic transducer) and producing first signals which are indicative of the monitored rate, comparing the first signals with a preferably variable reference signal denoting the desired or optimum rate of fluid flow through the wrappers, generating a third signal (e.g., at the output of a signal comparing stage) which denotes the differences between the first signals and the selected reference signal, and utilizing the third signals to change the combined area of holes in the wrappers; this last mentioned step includes increasing the combined area of holes when the desired rate exceeds the monitored rate and reducing the combined area of holes when the desired rate is less than the monitored rate. The aforementioned steps are carried out automatically in the above-given sequence.

The last mentioned step (of utilizing the third signals) can include changing the size and/or the number of holes in the wrappers. The size of holes can be changed in a number of ways, for example, by resorting to needles or analogous piercing instrumentalities whose cross-sectional area varies along their length, by burning holes into the material of the wrappers as a result of spark discharge whose intensity can be changed to thus change the size of the holes, or by changing the intensity of a beam of coherent radiation (preferably a laser beam) which is caused to impinge upon the material of the wrappers. The number of holes, too, can be changed in any one of several ways, for example, by increasing or reducing the number of piercing instrumentalities which penetrate into successive wrappers, by changing the number of punching tools which cooperate with suitable anvils to remove material from the wrappers, by changing the frequency of spark discharge per wrapper or by changing the frequency at whch a laser beam impinges upon successive wrappers.

The first mentioned (hole making) step can also include rotating the articles about their respective axes and making holes in the wrappers of rotating articles, preferably by resorting to teeth, needles or analogous mechanical piercing instrumentalities. Such instrumentalities do not remove any material from the wrappers; they merely puncture the wrappers and bend the material around the locus of penetration.

Still further, the first mentioned (hole making) step may include rotating the articles about their axes and removing material from the wrappers of rotating articles. Alternatively, such first step may comprise withdrawing a continuous web of cigarette paper, imitation cork or other flexible wrapping material from a reel or another suitable source of supply and providing holes (by means of punching tools, needles, spark discharge or laser beam) in selected portions of the web. The method then further comprises the step of converting the web into wrappers of rod-shaped articles prior to the testing step. The web may constitute flexible material which is draped around tobacco fillers or fillers consisting of filter material, or flexible material which is converted into uniting bands serving to connect filter plugs with wrapped tobacco fillers to form filter cigarettes, cigarillos or cigars. The subdivision of the web into portions of or entire wrappers (either prior or subsequent to draping) is carried out in such a way that each wrapper is formed with the same number of holes.

As mentioned above, if the first (hole making) step includes subjecting the wrappers (or the material of the wrappers) to a mechanical piercing action (of conical needles or the like), the last step (of utilizing the third signals) includes varying the extent of the piercing action or the number of holes which are formed by the needles.

If the first step includes effecting a spark discharge across the material of the wrappers so that the holes are formed by combustion of selected portions of the wrappers (preferably prior to draping of the web around one or more rod-like fillers), the last step includes changing the frequency and/or intensity of spark discharge per wrapper.

If the first step includes directing at least one laser beam against successive wrappers (preferably before the web is draped around one or more rod-like fillers), the last step includes changing the intensity and/or the number of impingements of the beam upon successive wrappers.

Automatic regulation of the hole making step insures that the number of articles (if any) whose wrappers exhibit unsatisfactory permeability is reduced to a minimum. Therefore, the number of rejects is also minimal and the consumer invariably receives a product which is less likely to affect his or her health because the column of smoke is mixed with a predetermined quantity of cooler atmospheric air. The manner in which articles having defective wrappers are segregated from acceptable articles subsequent to repeated testing is disclosed, for example, in commonly owned U.S. Pat. No. 3,847,044 granted Nov. 12, 1974 to Rudszinat. The number of segregated articles is reduced because many types of ejecting mechanisms for cigarettes or the like segregate articles whose wrappers exhibit excessive or insufficient porosity or permeability. The improved method insures that the permeability of each wrapper equals or exceeds a predetermined minimum value.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged elevational view of a detail in FIG. 1, showing one form of the improved apparatus which is designed to make perforations in the wrappers of filter cigarettes of double unit length;

FIG. 3 is an enlarged transverse vertical sectional view as seen in the direction of arrows from the line III—III of FIG. 2;

DESCRIPTION OF THE PREFERRED EMBODIMENTS

Figure 1:
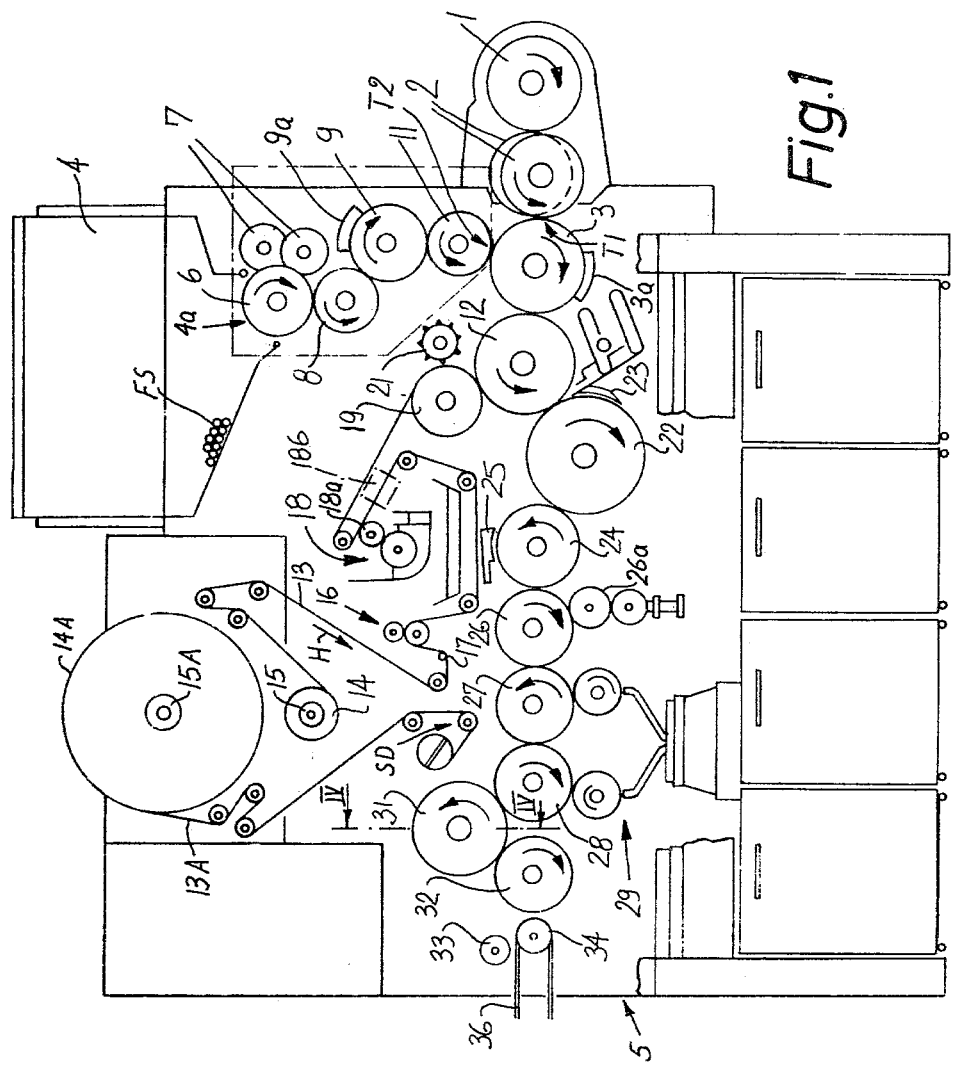
FIG. 1 is a schematic elevational view of a filter cigarette making machine including apparatus which embody the present invention.

FIG. 1 shows a filter cigarette making machine of the type known as "MAX S" produced by Hauni-Werke Körber & Co. KG, Hamburg, Federal Republic Germany. The machine comprises a frame 5 which supports a rotary drum-shaped row forming conveyor 1. This conveyor can be said to form part of a cigarette maker which turns out plain cigarettes of unit length, for example, a machine known as GARANT (trademark)

produced by Hauni-Werke. The conveyor 1 has peripheral flutes which are parallel to its axis and carry plain cigarettes of unit length in such a way that the cigarettes form two rows. The evenly numbered flutes transport a first row of plain cigarettes which are nearer to one axial end, and the oddly numbered flutes carry a second row of plain cigarettes which are nearer to the other axial end of the conveyor 1.

Successive plain cigarettes of one row are introduced into successive flutes of one of two rotary drum-shaped aligning conveyors 2 which are mounted in the frame 5 adjacent the conveyor 1, and successive plain cigarettes of the other row transferred into successive flutes of a second rotary drum-shaped aligning conveyor 2. The conveyors 2 are driven at different speeds and/or transport the plain cigarettes of the respective rows through different distances so that each plain cigarette of one row is transferred into a peripheral flute of a rotary drum-shaped assembly conveyor 3 simultaneously with a plain cigarette of the other row. The transfer station between the conveyors 2 on the one hand the conveyor 3 on the other hand is shown at T1. Each flute of the assembly conveyor 3 which advances beyond the transfer station T1 contains two coaxial plain cigarettes of unit length which are preferably separated from each other by a gap whose width slightly exceeds the length of a filter mouthpiece or filter plug of double unit length.

The upper portion of the frame 5 supports a magazine or hopper 4 for a supply of parallel filter rod sections FS of six times unit length. The outlet 4a of the magazine 4 receives a portion of a rotary drum-shaped severing conveyor 6 having peripheral flutes which receive filter rod sections FS and transport such sections sideways in a clockwise direction, as viewed in FIG. 1. Successive sections FS are moved seriatim past two rotary disk-shaped knives 7 which are disposed in different planes extending at right angles to the axis of the conveyor 6 and serve to subdivide the sections FS into groups of three coaxial filter rod sections or filter plugs of double unit length.

Groups of three coaxial filter plugs each are transferred into the peripheral flutes of three rotary drum-shaped staggering conveyors 8 (only one shown in FIG. 1) which transport the respective plugs at different speeds and/or through different distances so as to shift the originally aligned plugs of each group in the circumferential direction of the illustrated conveyor 8. Individual plugs are thereupon transferred into successive flutes of a rotary drum-shaped shuffling conveyor 9 which conveyor 9 which cooperates with stationary cams 9a to shift some or all of the filter plugs axially and to thus array the plugs in the form of a single row wherein the plugs travel sideways and are in exact register with each other, i.e., the end faces of each preceding plug are coplanar with the end faces of the next-following plug.

The shuffling conveyor 9 introduces successive plugs of the thus obtained now into successive flutes of a rotary drum-shaped accelerating conveyor 11 which inserts plugs into successive flutes of the assembly conveyor 3 at a second transfer station T2 located ahead of the station T1. The position of the accelerating conveyor 11 is such that the plugs which are admitted into successive flutes of the assembly conveyor 3 are located in the gaps between successive pairs of coaxial plain cigarettes of unit length as soon as the respective flutes of the conveyor 3 reach the transfer station T1. In other words, each flute of the conveyor 3 which advances beyond the transfer station T1 contains a group of three coaxial rod-shaped components including a centrally located filter plug of double unit length and two plain cigarettes of unit length. Such groups advance between two stationary condensing cams 3a which shift the plain cigarettes of successive groups axially toward each other to thereby move the inner end faces of the plain cigarettes into abutment with the adjacent end faces of the respective plug. The condensed groups are introduced into successive flutes of a rotary drum-shaped transfer conveyor 12 which is driven in a counterclockwise direction, as viewed in FIG. 1, and advances the groups past a rotary suction drum 19 serving to provide each group with an adhesive-coated uniting band.

The upper left-hand portion of the frame 5 supports a spindle 15 for a reel 14 consisting of a convoluted web material 13, such as cigarette paper, artificial cork or the like. The web 13 is withdrawn from the reel 14 by two advancing or transporting rolls 16 at least one of which is driven and the other of which is preferably biased against the one roll to advance the web 13 lengthwise in the direction indicated by arrow H. Successive increments of the web 13 which advance toward the nip of the rolls 16 move past and are flexed by the preferably sharp edge of a so-called curling tool 17 which may be of the type disclosed in commonly owned U.S. Pat. No. 3,962,957 granted June 15, 1976 to Alfred Hinzmann. The purpose of the tool 17 is to equalize internal stresses in the material of the web and to impart to the web a tendency to curl in a direction which is desirable when the web is converted into a series of discrete uniting bands. The leader of the web 13 adheres to the periphery of the drum 19 which is formed with suction ports and rotates at a speed slightly exceeding the speed of lengthwise movement of the web under the action of advancing rolls 16. This insures that successive uniting bands are separated from each other by narrow clearances and the next-following bands cannot interfere with the application of preceding bands to successive groups of rod-shaped components in the flutes of the transfer conveyor 12.

The suction drum 19 draws the web 13 through a paster 18 which coats one side of the web with a suitable adhesive (the adhesive is applied by a roller-shaped applicator 18a serving to coat that side of the web 13 which faces away from the periphery of the drum 19). The drum 19 cooperates with a rotary drum-shaped knife 21 having one or more blades which subdivide or sever the leader of the web 13 at regular intervals to form a succession of adhesive-coated uniting bands. Each band is applied to the oncoming group of rod-shaped components in a flute of the transfer conveyor 12 in such a way that the web extends tangentially of the group and adheres to the periphery of the respective filter plug of double unit length as well as to the inner end portions of the respective plain cigarettes of unit length.

The transfer conveyor 12 delivers successive groups (each of which carries an adhesive-coated uniting band) into the flutes 22a (see FIG. 2) of a rotary drum-shaped wrapping conveyor 22 which cooperates with a stationary or mobile rolling device 23 to rotate successive groups about their respective axes and to thus convert the uniting bands into tubes which sealingly surround the respective filter plugs and the adjacent inner end portions of the respective plain cigarettes. Thus, each group is converted into a filter cigarette 39 (see FIGS.

2 and 3) of double unit length which is transported sideways.

Successive filter cigarettes 39 are transferred onto a rotary drum-shaped rolling conveyor 24 cooperating with a perforating unit 25 which is constructed, assembled and adjustable in accordance with one embodiment of the invention. The purpose of the unit 25 is to provide portions of wrappers of successive filter cigarettes 39 of double unit length with perforations or holes which admit atmospheric air into the column of tobacco smoke flowing into the smoker's mouth.

The conveyor 24 delivers successive filter cigarettes 39 into successive flutes of a rotary drum-shaped severing conveyor 26 which cooperates with a rotary disk-shaped knife 26a to sever each cigarette 39 midway between its ends (i.e., across the respective tube and filter plug of double unit length) so that each cigarette 39 yields two coaxial filter cigarettes Z (FIG. 4) of unit length. The severing conveyor 26 may form part of a testing device which detects defective filter cigarettes 39 (e.g., cigarettes having wrappers with open seams or cigarettes wherein one of the rod-shaped components is missing) and segregates defective cigarettes from satisfactory cigarettes 39.

The conveyor 26 delivers satisfactory pairs of filter cigarettes Z of unit length into the flutes of a rotary drum-shaped conveyor 27 forming part of a turn-about device 29 of the type disclosed in commonly owned U.S. Pat. No. 3,583,546 granted June 8, 1971 to Koop. The purpose of the device 29 is to turn one filter cigarette of each pair of coaxial filter cigarettes Z of unit length end-for-end and to place the inverted cigarettes between the non-inverted cigarettes (in the flutes of a drum 28 forming part of the device 29) so that the drum 28 transports a single row of filter cigarettes of unit length wherein all filter plugs or mouthpieces F' of unit length (see FIG. 4) face in the same direction.

Successive filter cigarettes Z of the thus obtained single row are transferred onto a rotary drum-shaped conveyor 31 forming part of a pneumatic testing device 40 which examines successive filter cigarettes and effects or causes segregation of satisfactory articles from defective articles. The ejection of defective filter cigarettes of unit length preferably takes place during transport in the flutes of a further rotary drum-shaped conveyor 32 which receives cigarettes from the conveyor 31 and delivers satisfactory filter cigarettes of unit length onto the upper reach of a belt conveyor 36 trained over several pulleys (one shown at 34). The illustrated pulley 34 cooperates with a braking roller 33. The row of filter cigarettes on the upper reach of the belt conveyor 36 is transported into storage, into so-called chargers or trays, or directly into the magazine of a packing machine, not shown.

The frame 5 further supports a second spindle 15A for a fresh reel 14A consisting of convoluted web material 13A. The leader of the web 13A is held in a position of readiness at a splicing station SD which comprises suitable means (not shown) for attaching the leader to the trailing portion of the web 13 when the supply of web on the expiring reel 14 is reduced to a predetermined minimum value.

FIGS. 2 and 3 show the details of the perforating unit 25. The conveyor 24 has ribs or projections 37 which alternate with convex rolling surface sections or facets 38 forming part of the cylindrical peripheral surface of the conveyor 24. The direction of rotation of the conveyor 24 is indicated by an arrow. The body of the conveyor 24 has suction ports 41 which communicates with the sections 38 upstream of each rib 37 and suction ports 42 which communicate with the sections 38 downstream of each rib 37. The conveyor 22 delivers filter cigarettes 39 of double unit length in such a way that each cigarette 39 is attracted by a suction port 41 immediately upstream of the neighboring rib 37. It is clear that the body of the conveyor 24 can be provided with rows of suction ports 41 and 42, i.e., with two or more suction ports 41 upstream of each rib 37 and with two or more suction ports 42 downstream of each rib. The manner in which the suction ports 41, 42 are connected with a suction generating device (e.g., a suction fan, not shown) while the corresponding ribs 37 travel from the transfer station between the conveyors 22, 24 to the transfer station between the conveyors 24, 26 is known from the art of machines for the transport and processing of rod-shaped smokers' products. As a rule, the body of the conveyor 24 will be formed with blind bores which are parallel to the axis of the conveyor 24 and communicates with the arcuate groove of a stationary valve plate which is adjacent to one end face of the conveyor 24. The groove of the valve plate is connected with the suction intake of a fan or the like.

The length of each section or facet 38 (as considered in the circumferential direction of the conveyor 24) at least equals the circumference of a filter cigarette 39 of double unit length. The reference characters T denote the plain cigarettes and the reference character F denotes the filter plug or mouthpiece of the filter cigarette 39 which is shown in FIG. 3.

The perforating unit 25 comprises a housing having two sections 25a, 25b which define a compartment 43 for a carrier 44 of needle-like conical perforating or piercing elements 46. The elements 46 can be replaced by wedge-like teeth similar to those on a saw-tooth blade. Thus, instead of using two or more rows of needles, one can employ two or more serrated metallic or plastic strips having toothed (i.e., tapered) perforating elements. The carrier 44 has an elongated slot 47 (indicated in FIG. 2 by broken lines) which receives a guide pin 48 of the housing 25a, 25b. The pin 48 allows the carrier 44 to pivot relative to the housing 25a, 25b as well as to move lengthwise of the compartment 43. The slot 47 is adjacent to one end portion of the carrier 44, and the other end portion of the carrier has a transverse cylindrical bore 44a for a cylindrical eccentric 51 on a shaft 49 which extends from the housing 25a, 25b. The shaft 49 is journalled in the housing section 25b. The housing 25a, 25b is pivotable on a pin 53 which is mounted in or on the frame 5 (not shown in FIGS. 2 and 3) so that the entire unit 25 can be pivoted (anticlockwise) away from the operative position of FIG. 2 or (clockwise) toward such operative position. A bolt 54 or other suitable means is provided for locking the unit 25 in the operative position of FIG. 2. If the attendant wishes to pivot the unit 25 to an inoperative position, e.g., to gain access to the exposed portions of the perforating elements 46, the bolt 54 is removed from its socket in the frame 5 and the unit 25 is pivoted anticloskwise, as viewed in FIG. 2.

The operative position of the perforating unit 25 is selected in such a way that, when the bolt 54 extends into the aforementioned socket of the frame 5, the width of the elongated gap G between the adjacent rolling facet or section 38 and the concave surfaces 56a, 56b of the housing sections 25a, 25b is slightly less than the diameter of a filter cigarette 39 of double unit length.

Thus, when a cigarette 39 reaches the perforating station between the conveyor 24 and unit 25, it is caused to roll about its own axis because it is engaged by the corresponding section 38 as well as by the surfaces 56a, 56b. This causes the cigarette 39 to roll backwards, i.e., from the rib 37 at the front end toward the rib 37 at the rear end of the respective section 38. The center of curvature of concave surfaces 56a, 56b is located on the axis of the shaft 24a, the same as the centers of curvature of the convex sections 38. The perforating elements 46 form two rows which extend circumferentially of the conveyor 24 and are in register with the filter plugs F of successive filter cigarettes 39 of double unit length. The holes or perforations which are made by the elements 46 are preferably adjacent to the respective end portions of the filter plugs F, i.e., close to the locations where the filter plugs F abut against the inner ends of the respective plain cigarettes T. This insures that the mouthpiece of each filter cigarette of unit length has an annulus of perforations.

In accordance with a slight modification which is not shown in the drawing, the illustrated conveyor 24 can be replaced with a conveyor having relatively shallow peripheral flutes and the unit 25 can be replaced with a unit which is longer (as considered in the circumferential direction of the associated conveyor) so that each cigarette 39 is caused to roll several times about its own axis during travel through the gap between the conveyor and the perforating unit. The latter is then preferably provided with one or more additional rows of needles or analogous perforating elements which make holes in successive filter plugs F in regions other than those which are perforated by the illustrated elements 46. For example, the arrangement may be such that each cigarette 39 is caused to complete two full revolutions about its own axis and the perforating unit may comprise four rows of needle-like perforating elements which may but need not perforate the corresponding portions of successive plugs F at the same time, i.e., one or more rows can perforate successive filter plugs F during a first stage of movement of each filter plug between the conveyor and the perforating unit and the other row or rows may perforate successive filter plugs F during the next-following stage or stages of such movement.

The sections 38 together constitute a first surface at one side of the gap G and the surfaces 56a, 56b together constitute a second surface at the other side of the gap G opposite that section (or those sections) 38 which travels (or travel) below the unit 25. The needles 46 extend into the gap G beyond one of the first and second surfaces.

Figure 4:
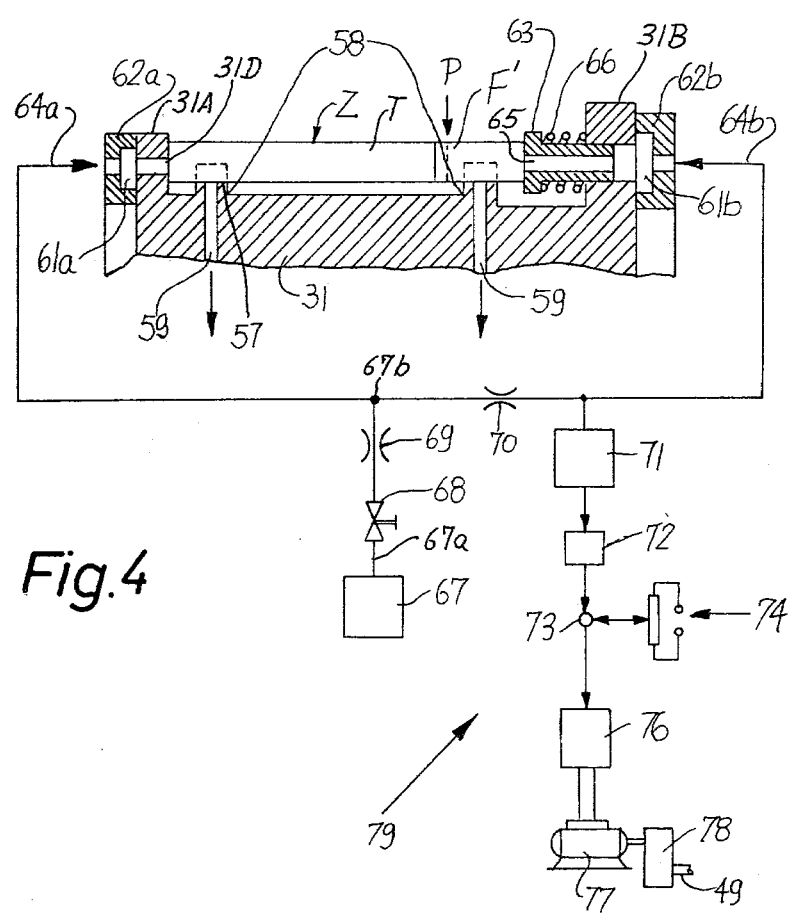
FIG. 4 is an enlarged fragmentary sectional view as seen in the direction of arrows from the line IV—IV of FIG. 1, showing a testing unit which serves to regulate the operation of the apparatus showing in FIGS. 2 and 3.

FIG. 4 shows a portion of the testing conveyor 31, certain other details of the pneumatic testing unit which includes the conveyor 31, and means for automatically adjusting the position of the carrier 44 relative to the conveyor 24 when the quantity of air or another testing fluid passing through the perforations of the wrappers of filter plugs F' of successive filter cigarettes Z of unit length deviates from an optimum quantity. The conveyor 31 has flutes which are parallel to its axis and each of which is defined by two concave sockets 57 in the outer end faces of two aligned projections 58. The projections 58 have suction ports 59 which extend radially inwardly and attract the respective filter cigarettes Z of unit length during travel between the conveyors 28 and 32. Each pair of suction ports 59 communicate with a blind bore which is machined into the body of the conveyor 32 and communicates with the arcuate groove of a stationary valve plate (not shown) which is adjacent to one end face of the conveyor 32. The groove of such valve plate is connected to the intake of a fan or the like which constitutes a suction generating device. The groove is long enough to attract the cigarettes Z during transport from the transfer station between the conveyors 28, 31 to the transfer station between the conveyors 31, 32.

The testing unit which includes the conveyor 31 further comprises two additional stationary valve plates 62a, 62b which are respectively adjacent to and bear against the left-hand and right-hand end faces of the conveyor 31 and respectively include arcuate grooves 61a, 61b connected with conduits 64a, 64b. The conduits 64a, 64b communicate with a source 67 of compressed air or another suitable gaseous testing fluid by way of a conduit 67a which contains a shutoff valve 68 and a preferably adjustable flow restrictor 69. If the flow restrictor 69 is not adjustable, the valve 68 is preferably adjustable so that it can regulate the pressure of testing fluid which flows from the source 67 into the conduits 64a, 64b.

A filter cigarette Z of unit length which is received in a flute (sockets 57) of the conveyor 31 is biased against a flange 31A of the conveyor 31 by a helical spring 66 which surrounds a nipple 63 abutting against the other end face of such cigarette. The nipple 63 is reciprocable in a second flange 31B of the conveyor 31. The flange 31A has bores 31D, one for each flute, which establish communication between the groove 61a of the valve plate 62a and the plain cigarettes of the respective filter cigarettes Z during travel toward, past and beyond the testing station of FIG. 4. The nipples 63 have axial bores 65 which establish communication betweeen the groove 61b and the right-hand end of the respective filter cigarette Z during travel past the testing station. The testing station extends between the grooves 61a and 61b. Each nipple 63 is retracted by a suitable stationary cam (not shown) before th coresponding flute reaches the transfer station between the conveyors 28, 31 so that the conveyor 28 can deliver a filter cigarette Z into the oncoming flute of the conveyor 31. The cam thereupon allows the spring 66 to expand and to move the end face of the plain cigarette T of the respective filter cigarette Z into abutment with the flange 31A whereby the interior of the wrapper of such filter cigarette communicates with the respective bore 31D. The nipple 63 is retracted against the opposition of its spring 66 before the filter cigarette Z reaches the transfer station between the conveyors 31, 32 so that the tested filter cigarette Z can be accepted by the oncoming flute of the conveyor 32. Cams which are suitable for controlling the movements of nipples 63 under and against the action of associated springs 66 are known from the art of testing apparatus for cigarettes or the like. Reference may be had to commonly owned U.S. Pat. No. 3,555,883 granted Jan. 19, 1971 to Heitmann.

Each filter plug F' which travels toward, past and beyond the testing station between the grooves 61a, 6b of FIG. 4 is provided with at least one circumferentially extending row of holes or perforations because such filter plug has advanced all the way through the gap G between the conveyor 24 and perforating unit 25 of FIGS. 1 to 3. The arrangement is preferably such that the nipples 63 bear against the exposed end faces of the filter plugs F' and the flange 31A abuts against the exposed end faces of the corresponding plain cigarettes T.

A flow restrictor 70 in the conduit 64b insures that the testing unit is most sensitive in regions P, i.e., in regions where the wrappers of filter plugs F' are provided with perforations.

The conduits 64a, 64b are connected with the input of a suitable transducer 71 (e.g., an electropneumatic diaphragm transducer) whose output transmits a first signal which is indicative of the quantity of testing fluid flowing through the perforations of the wrapper of the filter plug F' which advances between the grooves 61a, 61b of the stationary valve plates 62a, 62b. The transducer 71 may be a capacitive transducer similar to or identical with those disclosed in the commonly owned U.S. Pat. No. 3,412,856 to Esenwein.

The output of the transducer 71 transmits discrete first signals (one for each tested filter cigarette Z of unit length) to the input of an integrating circuit 72 whose output transmits a signal which is indicative of the average quantity of testing fluid flowing through a predetermined number of successive filter plugs F'. In other words, each signal at the output of the integrating circuit 72 is indicative of the permeability (caused by the needle-like perforating elements 46) of a group of successive filter plug wrappers. Such output signals are transmitted to one input of a signal comparing stage 73 another input of which receives reference signals from an adjustable potentiometer 74 or another suitable source of reference signals. The reference signals are indicative of the desired permeability of the wrappers of filter plugs F', and the output of the stage 73 transmits a (third) signal when the intensity or another characteristic of the selected reference signal deviates from the same characteristic of a signal which is transmitted by the output of the integrating circuit 72. The output of the signal comparing stage 73 transmits signals to a control circuit 76 for a reversible electric motor 77 which can adjust the angular position of the shaft 49 for the eccentric 51 of FIGS. 2 and 3 (clockwise or anticlockwise) by way of a suitable step-down transmission 78. The parts 72-74 together constitute an evaluating circuit 79 which changes the size of holes in successive filter plug wrappers in dependency on changes in the permeability of filter plug wrappers which advance past the testing station of FIG. 4.

The circuit 79 is desirable and advantageous because it insures automatic adjustment of the position of perforating elements 46 relative to the housing 25a, 25b and conveyor 24 whenever the quantity of air which can escape from the filter plugs F' deviates from an optimum quantity.

It is clear that the testing unit of FIG. 4 can operate with air or another testing fluid which is maintained at subatmospheric pressure. In certain respects, a testing unit which operates with suction is even more satisfactory than a testing unit which operates with pressurized testing fluid (see the source 67 of FIG. 4) because it establishes conditions which more closely resemble the conditions prevailing when a filter cigarette Z is lighted and the smoker draws tobacco smoke through the respective filter plug F'. If the manufacturer wishes to change the quantity of air which is to enter the filter plugs F' of cigarettes Z, the potentiometer 74 is adjusted so that it transmits a reference signal of different intensity.

The operation of the apparatus including the conveyor 24 and perforating unit 25 is as follows:

The flutes 22a of the wrapping conveyor 22 deliver filter cigarettes 39 of double unit length to the rolling conveyor 24 in such a way that each oncoming cigarette 39 is attracted to the intakes of suction ports 41 behind the adjacent rib 37. A cigarette 39 which has advanced from the three to the twelve o'clock position of the conveyor 24 shown in FIG. 2 is engaged by the surfaces 56a, 56b and is caused to roll about its own axis during travel through the gap G between the surfaces 56a, 56b and the respective surface section or facet 38 (as mentioned above, the width of the gap G is less than the diameter of a cigarette 39). During such rolling of the cigarette, the needles 46 provide the wrapper of the respective filter plug F with two annuli of perforations whose diameters depend on the angular position of the shaft 49, i.e., on the distance between the tips of the conical needles 46 and the adjacent section 38. When the cigarette 39 reaches the left-hand end of the gap G, as viewed in FIG. 2, it is attracted to the intakes of suction ports 42 in the respective section 38 and is transported beyond the perforating unit 25 to be introduced into the oncoming flute 26A of the severing conveyor 26. The knife 26a severs the cigarettes 39 on the conveyor 26, and the resulting pairs of coaxial filter cigarettes Z of unit length are transferred onto the conveyor 27 of the turn-around device 29. Each flute of the testing conveyor 31 receives a single cigarette Z which is held between the flange 31A and the respective nipple 63 during travel past the testing station between the arcuate grooves 61a, 61b. The transducer 71 transmits (first) signals which are indicative of the permeability of wrappers of successive cigarettes Z and the output of the integrating circuit 72 transmits signals which are indicative of the average or combined permeability of a predetermined number of successively tested cigarettes Z. Such signals are compared with the reference signal from the potentiometer 74, and the output of the stage 73 transmits corresponding (positive or negative) signals to the control circuit 76 for the reversible adjusting motor 77. The motor 77 causes the transmission 78 to rotate the shaft 49 clockwise or anticlockwise in order to move the needles 46 nearer to or away from the conveyor 24, depending upon the nature of signals transmitted by the stage 73. The needles 46 are moved nearer to the conveyor 24 if the average permeability of a series of successively tested cigarettes Z is too low, and vice versa. In other words, the needles 46 form perforations of larger diameter if the signal at the output of the stage 73 is a negative signal (insufficient permeability), and the needles 46 form perforations of smaller diameter if the permeability of the wrappers of the preceding series of cigarettes Z is too high.

Figure 5:
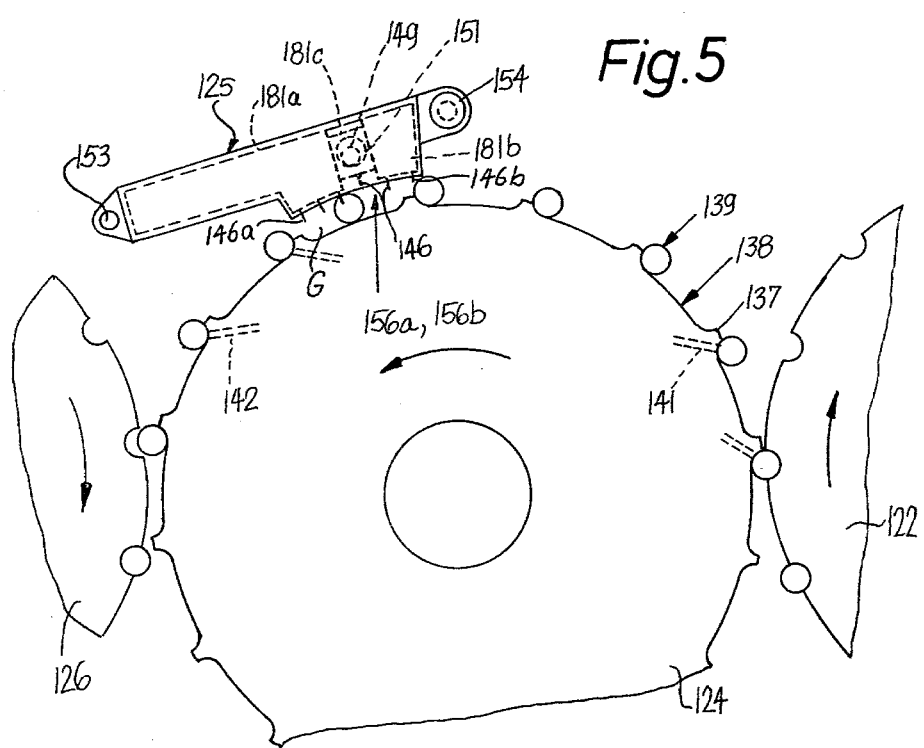
FIG. 5 is an elevational view of an apparatus which constitutes a modification of the apparatus shown in FIG. 2.

FIG. 5 shows a portion of a second filter cigarette making machine having a modified perforating unit 125. All such parts of the second machine which are identical with or clearly analogous to corresponding parts of the machine shown in FIGS. 1 to 4 are denoted by similar reference characters plug 100.

The carrier in the housing of the perforating unit 125 of FIG. 5 comprises three portions 181a, 181b and 181c. The portions 181a and 181b are fixedly mounted in the housing of the unit 125 and constitute guide means or ways for the median portion 181c which is movable toward and away from the adjacent surface section or facet 138 of the rolling conveyor 124. The median portion 181c carries two needles 146 which are located behind each other, as considered in the axial direction of the conveyor 124. Thus, one of these needles can perforate that half of the filter plug of a filter cigarette 139 of double unit length which is nearer to the observer of FIG. 5 and the other needle 146 of the median portion 181c can perforate the other half of the filter plug. This insures that one of the perforations which are formed by the needles 146 is provided in the wrapper of the filter plug of one of two filter cigarettes of unit length and the other perforation is formed in the other of two filter cigarettes of unit length which are obtained in response to severing of a filter cigarette 139 on the conveyor 126.

The eccentric 151 on the shaft 149 of FIG. 5 can shift the median portion 181c of the carrier toward or away from the conveyor 124. The shaft 149 is turnable between two positions in one of which the needles 146 are withdrawn from the path of cigarettes 139 in the gap G and in the other of which the needles 146 perforate such cigarettes during travel below the perforating unit 125. The means for adjusting the shaft 149 of FIG. 5 is analogous to the adjusting means for the shaft 49 of FIG. 4, except that the motor 77 completes a predetermined number of revolutions (either clockwise or counterclockwise) in response to transmission of signals from the control circuit 76. Thus, the motor 77 merely moves the shaft 149 between the aforementioned two positions in which the needles 146 respectively extend into or are withdrawn from the path of movement of cigarettes 139 in the gap G. Each cigarette 139 which moves through the gap G of FIG. 5 is perforated by all needles 146a, 146b of the carrier portions 181a, 181b. The motor 77 for the shaft 149 is assumed to complete several revolutions in response to each (positive or negative) signal from the output of the circuit 76 because the transmission for the shaft 149 is a step-down transmission.

Figure 6:
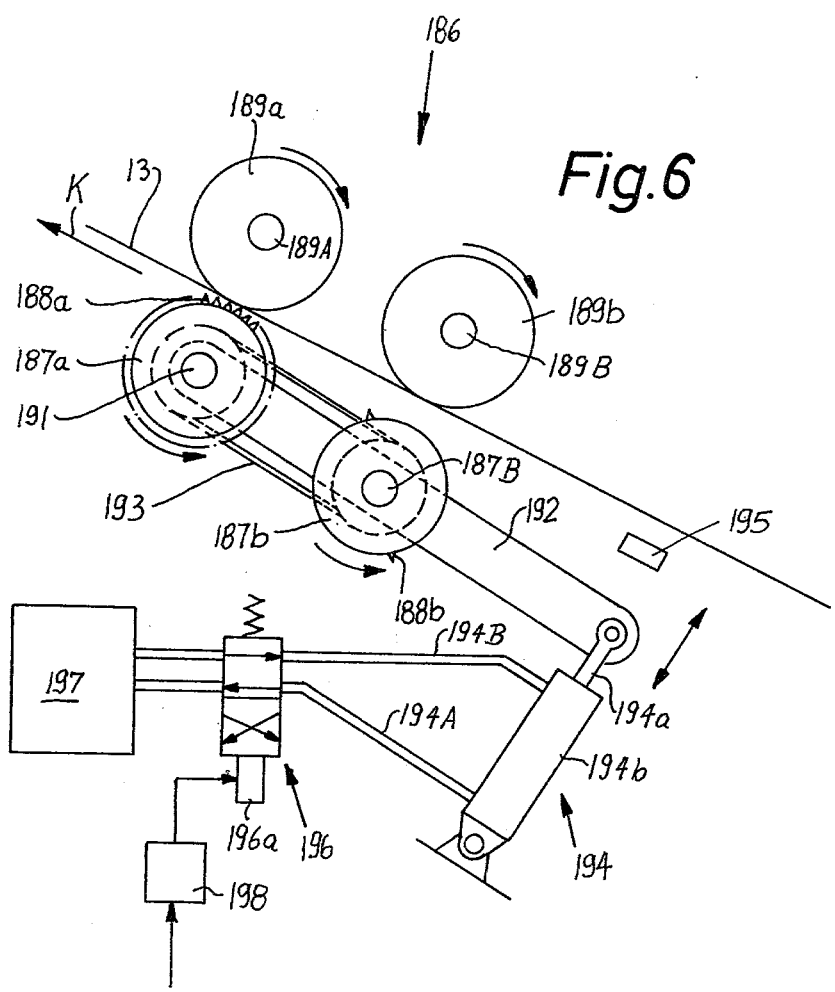
FIG. 6 is a schematic elevational view of an apparatus which can be used in the machine of FIG. 1 as a substitute for the apparatus of FIG. 2 or 5 and is designed to make perforations in a web which is converted into portions of wrappers of filter cigarettes of double unit length.

FIG. 6 shows a mechanical perforating unit 186 which can be installed upstream of the paster 18 of FIG. 1, i.e., this unit is designed to perforate the web 13 prior to conversion of the web into uniting bands and prior to conversion of uniting bands into tubes surrounding the filter plugs of the respective filter cigarettes of double unit length. The perforating unit 186 can be used as a substitute for the perforating unit 25 or 125. If the unit 25 or 125 is omitted, the conveyor 24 or 124 can be replaced with a conventional rotary drum-shaped conveyor having flutes machined into its peripheral surface to transport filter cigarettes of double unit length from the wrapping conveyor 22 or 122 to the severing conveyor 26 or 126. If desired, the conveyor 24, 124 (or the just mentioned simplified substitute for 24 or 124) can serve as a drying conveyor to promote the setting of adhesive on the convoluted uniting bands.

The perforating unit 186 of FIG. 6 comprises two rotary members or rollers 187a, 187b located at one side of the path of movement of the web 13 from the applicator 18a of FIG. 1 toward the suction drum 19. The rollers 187a and 187b are respectively provided with punching tools 188a, 188b which extend radially beyond the peripheral surfaces of the respective rollers and can remove material from the web 13 to provide the web with perforations or holes of predetermined diameter. The tools 188a and/or 188b can form one or more annuli about the peripheries of the respective rollers 187a, 187b.

The roller 187a cooperates with a rotary anvil or counterroller 189a which is located at the other side of the path of movement of the web 13 and whose peripheral surface is preferably hard to insure that the annular cutting edges of the tools 188a can provide the web 13 with holes of predetermined diameter without fraying of the material around the holes. The tools 188a are operative at all times, i.e., whenever the web 13 is in motion, to provide the web with a basic group of perforations, namely, with one group for each uniting band. The roller 187b can cooperate with a second rotary anvil or counterroller 189b when the testing unit of FIG. 4 determines that the permeability of wrappers of a series of succesisve filter cigarettes Z of unit length is too low. The number of tools 188b is normally less than the number of tools 188a; for example, the roller 187 can carry two punching tools 188b which are located diametrically opposite each other.

The rollers 187a, 187b, 189a and 189b are driven by the prime mover of the filter cigarettes making machine in the directions indicated by arrows. The direction in which the web 13 is moved by the suction wheel 19 of FIG. 1 is indicated by the arrow K. The rollers 187a, 189a, 189b rotate about fixed axes (see the shafts 191, 189A 189B). The shaft 187B for the roller 187b is mounted on a pivotable support or lever 192 which is turnable on the shaft 191 for the roller 187a. The roller 187a is rigid with a pulley which drives a toothed belt 193 serving to transmit torque to the roller 187b.

When the roller 187b is held in the illustrated idle or retracted position, the web 13 is formed with perforations during travel through the nip of the rollers 187a, 189a, i.e., the tools 188b are incapable of cooperating with the peripheral surface of the roller 189b. The means for moving the roller 187b between the inoperative position of FIG. 6 and an operative position in which the tools 188b form holes in the web 13 comprises a double-acting pneumatic cylinder and piston unit 194 whose piston rod 194a is articulately connected to the free end of the lever 192 and whose chambers are connected with preferably flexible conduits 194A, 194B. The flow of pressurized fluid (e.g., compressed air) between the chambers of the cylinder 194b of the unit 194 and a source 197 of compressed fluid or the atmosphere is regulated by a solenoid-operated valve 196 which is installed in the conduits 194A, 194B and whose solenoid 196a is energizable by a threshold circuit 198. When the conduit 194A admits pressurized fluid into the lower chamber of the cylinder 194b and the conduit 194B connects the upper chamber with the atmosphere, the lever 192 is pivoted anticlockwise, as viewed in FIG. 6, and abuts against a stop 195. The roller 187b is then maintained in the operative position.

The threshold circuit 198 and the valve 196 replace the parts 76–78 of the adjusting means shown in FIG. 4.

The operation:

The tools 188a of the roller 187a perforate spaced-apart portions of the running web 13 so that each uniting band which is obtained in response to subdivision of the web 13 by the blades of the knife 21 is formed with a predetermined (basic) number of perforations. The unit 194 normally maintains the roller 187b in the idle position of FIG. 6. However, if the output of the signal comparing stage 73 of FIG. 4 transmits a signal which indicates that the average permeability of the wrappers of a series of successive plain cigarettes Z is too low, the threshold circuit 198 transmits a signal which energizes the solenoid 196a and the valve 196 admits pressurized fluid into the lower chamber of the cylinder 194b while permitting the conduit 194B to communicate with the atmosphere. The lever 192 is pivoted against the stop 195 and the tools 188b of the roller 187b cooperate with the roller 189b to provide the web 13 with additional perforations. For example, the threshold circuit 198 will energize the solenoid 196a in response to progressing wear upon the cutting edges of the tools 188a and/or in response to breakage of one or more tools 188a.

Figure 7:
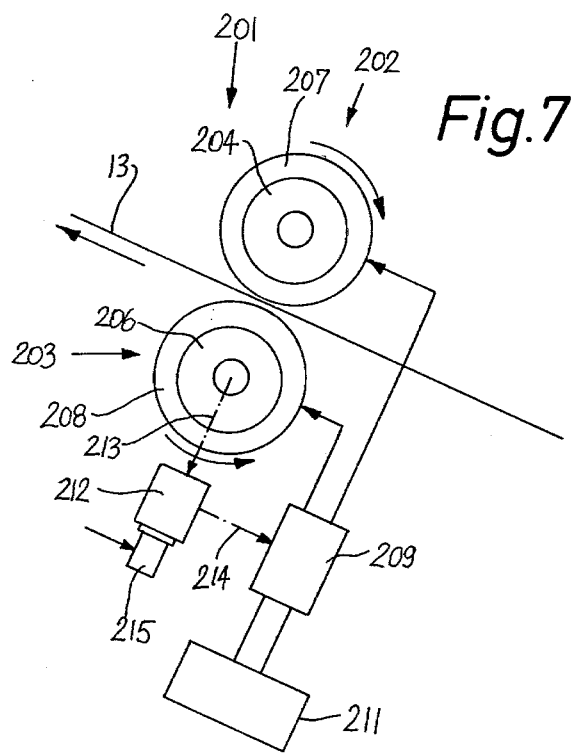
FIG. 7 is a schematic elevational view of an apparatus which can be used as a substitute for the apparatus of FIG. 6 and is provided with means for burning holes into the web.

FIG. 7 shows a perforating unit 201 which can be used as a substitute for the perforating unit 186 of FIG. 6. The unit 201 produces sparks which burn holes into the material of the running web 13. The web travels through the relatively narrow clearance between two rotary members 202 and 203 which are driven by the prime mover of the filter cigarette making machine to rotate in the directions indicated by arrows. The rotary member 202, 203 respectively comprise hubs 204, 206 consisting of electrically insulating material and ring-shaped rims 207, 208 consisting of brass or other suitable conductive material. The rims 207, 208 are connected with a source 211 of high-voltage energy by way of a rotating commutator 209 and conventional brushes and slip rings (not specifically shown in FIG. 7). The commutator 209 is connected with the prime mover of the filter cigarette making machine by way of an infinitely variable speed transmission 212. The operative connection between the prime mover (which drives the shaft of the rotary member 203) and the transmission 212 is indicated by the phantom line 213; the phantom line 214 denotes the connection between the transmission 212 and the comutator 209. The ratio of the transmission 212 and hence the RPM of the commutator 209 can be adjusted by a servomotor 215 which is a functional equivalent of the motor 77 shown in FIG. 4, i.e., it receives signals from the control circuit 76.

The operation is as follows: Sparks are discharged between the rims 207, 208 at a rate which is determined by the RPM of the commutator 209, and such sparks burn holes in the web portions travelling through the clearance between the rotary members 202 and 203. Depending on the construction of the rims 207, 208, these parts can cause one, two or more sparks to develop at the same time so that the web 13 is formed with one, two or more rows of perforations. The number of perforations which are burned into each unit length of the web 13 (i.e., into each uniting band) depends on the ratio of the transmission 212, i.e., on the permeability of wrappers of cigarettes Z which are monitored at the testing station of FIG. 4.

Figure 8:
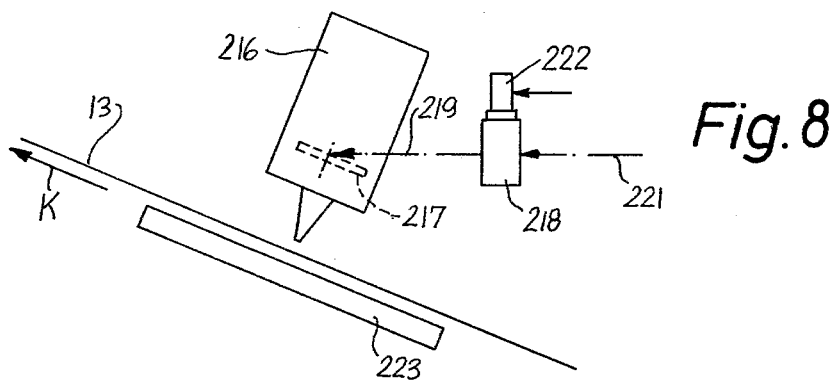
FIG. 8 is a schematic elevational view of an apparatus which can be used as a substitute for the apparatus of FIG. 6 or 7 and perforates the web by means of a beam of coherent radiation.

FIG. 8 shows a further perforating unit. The spark generating means of FIG. 7 is replaced by a source of coherent radiation, preferably a $CO_2$ impulse laser 216. The beam of coherent radiation which is emitted by the laser 216 can reach the web 13 by way of apertures in a rotary disk 217 which is indicated by broken lines. The web 13 is advanced at a constant speed in the direction indicated by arrow K and travels between the disk 217 and an aluminum plate 223 having a roughened surface facing the web.

The speed of the disk 217 (and hence the number of holes in each unit length of the web 13) can be changed by an infinitely variable speed transmission 218 which is operatively connected with the disk (the torque transmitting connection is indicated by the phantom line 219). The transmission 218 is driven by the prime mover of the filter cigarette making machine (the operative connection is indicated by the phantom line 221), and the ratio of the transmission (and hence the RPM of the disk 217) can be changed by a servomotor 222 constituting a functional equivalent of the motor 77 shown in FIG. 4. Thus, the signals which are transmitted by the control circuit 76 regulate the speed of the disk 217 and hence the frequency at which the laser beam can impinge upon the web 13 per unit of time. The plate 223 intercepts the beam which has penetrated through the material of the web 13.

The perforating units of FIGS. 6, 7 and 8 can be used with equal advantage in a machine for the production of plain cigarettes, for example, in the aforementioned GARANT (trademark) produced by the assignee of the present application, or in a machine for the making of filter rod sections. In a cigarette maker, the web of cigarette paper normally passes through a conventional imprinting mechanism which is located ahead of the locus where the web reaches the garniture of the wrapping mechanism. The imprinting mechanism is used to apply printed matter to spaced-apart portions of the web. Such printed matter denotes the brand name of the cigarette, the name of the manufacturer and/or other information. The perforating unit of FIG. 6, 7 or 8 can be installed immediately ahead of or immediately behind the imprinting mechanism. The perforating unit is preferably set up in such a way that it forms one or more rows of holes extending transversely of spaced apart portions of the running cigarette paper web. The perforating unit is adjusted in accordance with the results of measurements of permeability of the wrappers of finished plain cigarettes. The testing unit for plain cigarettes can be installed at the discharge end of the cigarette maker, e.g., the row forming conveyor 1 of FIG. 1 can constitute a conveyor which transports plain cigarettes sideways through a testing station wherein the permeability of wrappers of plain cigarettes is monitored by a device similar or analogous to the testing unit of FIG. 4, and such device transmits signals to means for energizing the solenoid 196a of FIG. 6, for changing the ratio of the transmission 212 of FIG. 7 or for changing the ratio of the transmission 218 of FIG. 8. A cigarette maker which can be combined with a perforating unit of the type shown in FIG. 6, 7 or 8 is shown, for example, in FIG. 7 of the commonly owned copending application Ser. No. 766,927 filed Feb. 9, 1977 by Heitmann et al. The row forming conveyor 1 of FIG. 1 receives successive plain cigarettes which form a single file wherein the cigarettes move axially, and the conveyor converts such single file into one or more rows wherein the cigarettes move sideways.

An advantage of the improved method and apparatus is that the quantity of cool atmospheric air which is admixed to the column of tobacco smoke can be regulated and maintained at a desired level with a high degree of reproducibility. Furthermore, the number of rejects is reduced because the presence of articles whose wrappers exhibit excessive or insufficient permeability is detected before the articles leave the machine. Also, articles having wrappers of unsatisfactory permeability are not permitted to reach the customers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. A method of regulating the permeability of wrappers of rod-shaped articles which constitute or form part of smokers' products, comprising the steps of making holes in the wrappers so as to permit entry of atmospheric air when the respective products are lighted at one end and a column of tobacco smoke is drawn through the other end thereof; testing the articles with a gaseous fluid, including establishing a pressure differential between the exterior and the interior of the wrappers, at least in the region of the holes, so that the testing fluid flows through the wrappers at a rate which is a function of the combined area of holes in the wrappers, monitoring the rate of fluid flow through the wrappers and producing first signals indicative of the monitored rate; comparing said first signals with a reference signal denoting the desired rate of fluid flow through the wrappers; generating third signals denoting the difference between said first signals and said reference signal; and utilizing said third signals to change the combined area of holes in the wrappers, including increasing said combined area when the desired rate exceeds the monitored rate and vice versa.

2. The method of claim 1, wherein said last mentioned step includes changing the size of the holes.

3. The method of claim 1, wherein said last mentioned step includes changing the number of holes.

4. The method of claim 1, wherein said first mentioned step includes rotating the articles about their respective axes and piercing the wrappers of rotating articles.

5. The method of calim 1, wherein said first mentioned step comprises rotating the articles about their respective axes and removing the material of wrappers on rotating articles.

6. The method of claim 1, wherein said first mentioned step comprises withdrawing a continuous web of wrapping material from a source of supply and providing holes in selected portions of the web, and further comprising the step of converting said web into wrappers of rod-shaped articles prior to said testing step.

7. The method of claim 1, wherein said first mentioned step comprises subjecting the wrappers to a mechanical piercing action and said last mentioned step includes varying the extent of such piercing action.

8. The method of claim 1, wherein said first mentioned step comprises subjecting the wrappers to a mechanical piercing action and said last mentioned step includes varying the number of the thus obtained holes in successive wrappers.

9. The method of claim 1, wherein said first mentioned step comprises effecting a spark discharge across the material of the wrappers so that said holes are formed by combustion of selected portions of the wrappers, said last mentioned step including changing the frequency and/or intensity of spark discharge per wrapper.

10. The method of claim 1, wherein said first mentioned step comprises directing at least one beam of coherent radiation against successive wrappers and said last mentioned step includes changing the intensity and/or the number of impingements of the beam upon successive wrappers.

11. In a machine for the production and/or processing of rod-shaped articles which constitute or form part of smokers' products and wherein a wrapper surrounds at least one rod-like filler, the combination of means for transporting a succession of wrappers along a predetermined path; adjustable perforating means adjacent to a portion of said path and being operative to make holes in successive wrappers; means for pneumatically monitoring the permeability of successive wrappers downstream of said perforating means, including means for generating first signals denoting at least the permeability of those portions of successive wrappers which are provided with holes in said portion of said path; means for furnishing a reference signal denoting the desired permeability of wrappers; means for comparing said first signals with said reference signal, including means for transmitting third signals denoting the differences between said first signals and said reference signal; and means for adjusting said perforating means in response to said third signals so as to increase the combined area of holes in the wrappers when the desired permeability exceeds the monitored permeability and vice versa.

12. The combination of claim 11, further comprising means for conveying articles sideways past said monitoring means.

13. The combination of claim 11, wherein said perforating means includes adjustable means for making holes of different size and said adjusting means is operatively connected with said last mentioned adjustable means.

14. The combination of claim 11, wherein said perforating means includes means for changing the number of holes made in successive wrappers and said adjusting means is connected with said changing means.

15. The combination of claim 11, wherein said transporting means includes an endless conveyor which transports the articles sideways along said portion of said path, said conveyor having a peripheral article-supporting surface and said perforating means includes a second surface adjacent to said peripheral surface and defining therewith a gap having a width less than the diameter of a wrapper so that the articles entering said gap are caused to rotate about their respective axes, said perforating means further comprising piercing elements extending into said gap to make holes in the wrappers of rotating articles in said gap.

16. The combination of claim 15, wherein said piercing elements extend beyond one of said surfaces.

17. The combination of claim 16, wherein said piercing elements include at least one element which is movable into and retractable from said gap, said adjusting means being arranged to move said one element.

18. The combination of claim 15, wherein said piercing elements have portions of different cross-sectional area so that the extent to which said elements extend into said gap determines the size of holes, said perforating means further comprising mobile carrier means for said elements and said adjusting means including means for moving said carrier means in directions toward and away from said gap.

19. The combination of claim 11, further comprising a source of web-like wrapping material, means for withdrawing wrapping material from said source and for advancing the wrapping material along said portion of said path, means for subdividing said wrapping material into discrete wrappers downstream of said perforating means, said perforating means including means for making holes in successive portions of said wrapping material, each such portion being converted into a wrapper by said subdividing means.

20. The combination of claim 19, wherein said means for making holes includes at least one rotary member adjacent to said portion of said path and having means for removing portions of wrapping material in said portion of said path.

21. The combination of claim 20, wherein said removing means includes a plurality of punching tools.

22. The combination of claim 19, wherein said perforating means includes means for discharging sparks across said portion of said path so that the sparks burn holes into said wrapping material.

23. The combination of claim 19, wherein said perforating means includes at least one source of coherent radiation arranged to direct a beam against the wrapping material in said portion of said path and means for determining the frequency at which said beam impinges upon successive portions of said wrapping material.

* * * * *